(12) United States Patent
Ito (10) Patent No.: US 7,720,201 B2
(45) Date of Patent: May 18, 2010

(54) COMMUNICATION APPARATUS

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1169 days.

(21) Appl. No.: 11/326,295

(22) Filed: Jan. 6, 2006

(65) Prior Publication Data

US 2006/0192428 A1 Aug. 31, 2006

(30) Foreign Application Priority Data

Jan. 7, 2005 (JP) ............................. 2005-003114

(51) Int. Cl.
*H04M 3/22* (2006.01)
*H04M 11/00* (2006.01)
*H04M 9/00* (2006.01)
*H04L 1/00* (2006.01)
*H04B 3/30* (2006.01)

(52) U.S. Cl. .................. 379/24; 379/399.02; 379/22.08; 379/93.36; 379/392.01; 370/250; 370/285

(58) Field of Classification Search .................. 370/250, 370/285; 379/401, 22.03, 22.08, 24, 90.01, 379/93.36, 102.04, 387.01, 392.01, 398, 379/399.01; 375/257
See application file for complete search history.

(56) References Cited

U.S. PATENT DOCUMENTS 6,687,371 B1* 2/2004 Fischer et al. .......... 379/399.02

6,728,372 B2 4/2004 Soree et al.
7,324,587 B2* 1/2008 Nishizaki ..................... 375/222
2004/0125749 A1 7/2004 Nishizaki

FOREIGN PATENT DOCUMENTS

| JP | 2000-513900 A | 10/2000 |
|---|---|---|
| JP | 2001-203804 A | 7/2001 |
| JP | 2004 112490 | 4/2004 |
| WO | 9849782 A2 | 11/1998 |

* cited by examiner

*Primary Examiner*—Fan Tsang
*Assistant Examiner*—Mohammad K Islam
(74) *Attorney, Agent, or Firm*—Baker Botts L.L.P.

(57) ABSTRACT

In a communication apparatus has a line control unit that controls connection with a communication line network, a communication unit transmits/receives data through the communication line network. A detection circuit detects one of a line voltage value and a line current value when the communication apparatus is connected to the line network. A memory unit stores multiple voltage-current characteristic curves defining relationships of line voltage values with respect to line current values satisfying a predetermined standard. An adjusting unit adjusts the line voltage value and the line current value so as to satisfy the predetermined standard based on one of the voltage-current characteristic curves stored in the memory unit. A selecting unit selects another voltage-current characteristic curve different from the one of the voltage-current characteristic curves from among the multiple voltage-current characteristic curves stored in the memory unit. A re-adjusting unit adjusts one of the line voltage and a line current.

11 Claims, 11 Drawing Sheets

TABLE OF DC MASK CURVES CORRESPONDING TO OSCILLATING FREQUENCIES

| OSCILLATING FREQUENCY | IDENTIFIER | 1 | 2 | 3 | 4 | 5 |
|---|---|---|---|---|---|---|
| NO OSCILLATION | A | {V(mV),I(mA)} | {V(mV),I(mA)} | {V(mV),I(mA)} | {V(mV),I(mA)} | {V(mV),I(mA)} |
| | | {4000.0} | {4000.20} | {8000.40} | {9500.60} | {15000.150} |
| 20KHz~100KHz | B | {5000.0} | {6000.21} | {7400.40} | {9000.56} | {16000.150} |
| 100KHz~200KHz | C | {4000.0} | {4000.20} | {7800.40} | {9000.60} | {15000.150} |
| 200KHz~750KHz | B | {5000.0} | {6000.21} | {7400.40} | {9000.56} | {16000.150} |
| 750KHz~1MHz | D | {4500.0} | {5500.20} | {8500.40} | {9500.60} | {15000.150} |

TABLE OF DC MASK CURVES CORRESPONDING TO OSCILLATING FREQUENCIES

| OSCILLATING FREQUENCY | IDENTIFIER | {V(mV),I(mA)} | 1 | 2 | 3 | 4 | 5 |
|---|---|---|---|---|---|---|---|
| NO OSCILLATION | A | {V(mV),I(mA)} | {4000.0} | {4000.20} | {8000.40} | {9500.60} | {15000.150} |
| 20KHz~100KHz | B1 | {V(mV),I(mA)} | {5000.0} | {7000.21} | {7400.40} | {9000.56} | {16000.150} |
|  | B2 |  | {5000.0} | {6000.21} | {6400.40} | {9000.56} | {16000.150} |
|  | B3 |  | {5000.0} | {8000.21} | {8400.40} | {9000.56} | {16000.150} |
| 100KHz~200KHz | C1 | {V(mV),I(mA)} | {4000.0} | {4000.20} | {4000.40} | {9000.60} | {15000.150} |
|  | C2 |  | {5000.0} | {5000.20} | {5000.40} | {9000.60} | {15000.150} |
|  | C3 |  | {4500.0} | {5000.20} | {5500.40} | {10000.60} | {16000.150} |
| 200KHz~750KHz | D1 | {V(mV),I(mA)} | {5000.0} | {7000.21} | {7300.40} | {9500.56} | {16000.150} |
|  | D2 |  | {6000.0} | {8000.21} | {7600.40} | {9700.56} | {17000.150} |
|  | D3 |  | {5000.0} | {7000.21} | {7900.40} | {9900.56} | {18000.150} |
| 750KHz~1MHz | E1 | {V(mV),I(mA)} | {5300.0} | {6500.20} | {6900.40} | {10100.60} | {15000.150} |
|  | E2 |  | {5500.0} | {6800.20} | {7400.40} | {10500.60} | {17500.150} |
|  | E3 |  | {5800.0} | {7200.20} | {8000.40} | {10800.60} | {18500.150} |

COMMUNICATION APPARATUS

CROSS-REFERENCE TO RELATED APPLICATION

This application claims priority under 35 U.S.C. §119 from Japanese Patent Application No. 2005-003114, filed on Jan. 7, 2005. The entire subject matter of the application is incorporated herein by reference.

BACKGROUND

1. Technical Field

Aspects of the present invention relate to a communication apparatus and in particular to a communication apparatus that controls to suppress an oscillation in a line communication network when the communication apparatus is connected with a various kind of networks.

2. Description of Related Art

In order to maintain communication quality, a public line network is designed in accordance with predetermined standards. A communication apparatus connected to such a network is configured such that a line voltage or a line current is controlled so as to meet the standards, since a line resistance connected with an exchange installed in a telephone exchange station varies depending on the location of the communication apparatus.

Figure 10:
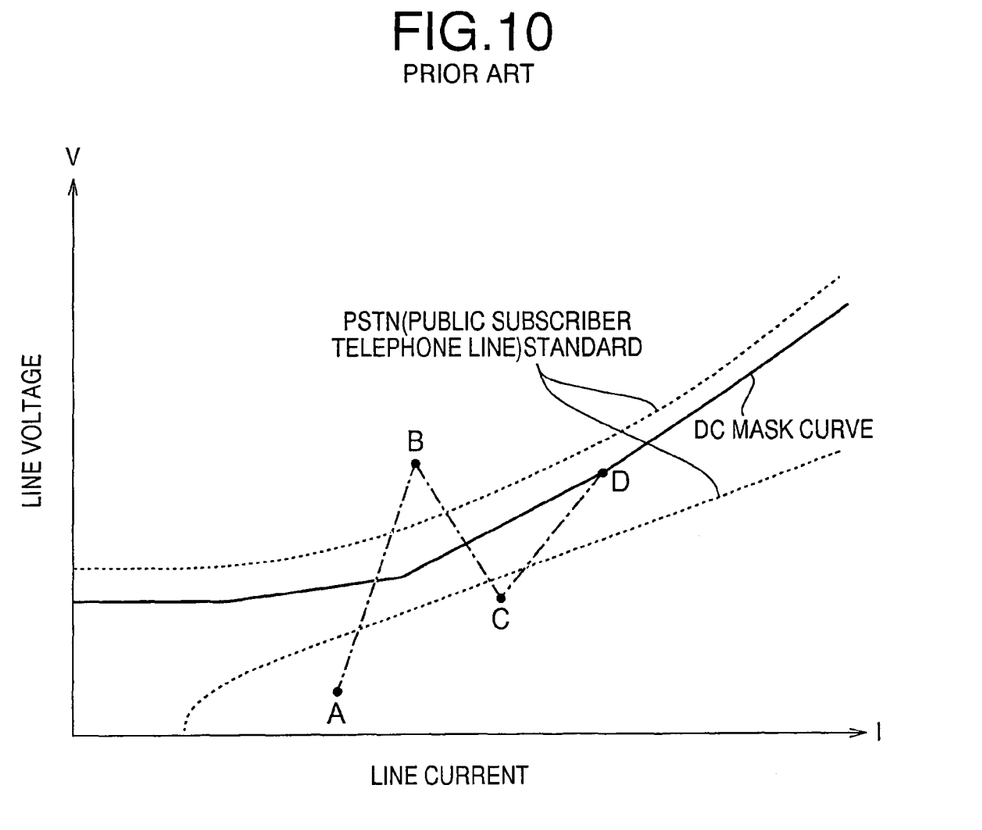
FIG. 10 is a graph showing a voltage-current characteristic and the DC mask curve according to the prior art.

For an example, Japanese Patent Provisional Publication P2004-112490A describes a communication apparatus that detects a line current and a line voltage, calculates line impedance, and adjusts the signal level of the modem based on the calculated impedance. Further, in order to control the line current and the line voltage which meet the standards of public line networks, etc., the apparatus adjusts a relation between the current and the voltage so as to satisfy the standards, based on a predetermined DC mask curve defining a relationship between the line current values and line voltage values. FIG. 10 is a graph showing an example of the DC mask curve used in a conventional communication apparatus.

In FIG. 10, a horizontal axis represents the line current value, while a vertical axis represents the line voltage. An area between two dotted lines represents line current values and line voltage values satisfying the public line standards.

A predetermined DC mask curve passing the above area is defined (indicated by solid line in FIG. 10), and by controlling the impedance of the line, the line current and the line voltage are adjusted.

For example, in FIG. 10, when initially a line current value and line voltage value are represented by point A, which is out of the area, point A is located below the DC mask curve and the values do not meet the standards. In such a case, the value of the line impedance is changed to a smaller value. Then, the line current value and the line voltage value are changed to values represented by point B. In this example shown in FIG. 10, point B is also out of the area (i.e., located above the DC mask curve). Therefore, the value of the line impedance is then changed to a larger value, and the line current value and the line voltage value are changed to point C. As shown in FIG. 10, still point C is out of the area (i.e., located below the DC mask curve), and the value of the line impedance is changed again to a smaller value. Then, the line current value and the line voltage value move to point D, which is substantially on the DC mask curve. The line current value and the line voltage value set in this way satisfy the standards.

However, when the line current value and the line voltage value are set in the way described above, an oscillation may occur as the network is in the resonant state with specific frequencies. The oscillation frequency is only within a frequency bandwidth from 20 kHz to 1 MHz, which is higher than an audio frequency range. However, the oscillation generated in the network would cause troubles such as generation of noises, malfunction in echo canceling while calling with a handset.

SUMMARY OF THE INVENTION

Aspects of the invention are advantageous in that there is provided an improved communication apparatus that can prevent an oscillation in a communication line to which the apparatus is connected.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided a communication apparatus, which is provided with a line control unit configured to control connection with a communication line network, a communication unit configured to transmit and receive data through the communication line network, a detection circuit configured to detect one of a line voltage value and a line current value when the communication apparatus is connected to the line network, a memory unit configured to store multiple voltage-current characteristic curves defining relationships of line voltage values with respect to line current values, an adjusting unit configured to obtain the line voltage and the line current based on the one of the line voltage value and the line current value, and adjusting the line voltage value and the line current value based on one of the voltage-current characteristic curves stored in the memory unit, a selecting unit configured to select another voltage-current characteristic curve which is different from the one of the voltage-current characteristic curves from among the multiple voltage-current characteristic curves stored in the memory unit, and a re-adjusting unit configured to control the adjusting unit based on the selected voltage-current characteristic curve selected by the selecting unit.

The memory unit may store two voltage-current characteristic curves, and the selecting unit may be configured to switch the selected voltage-current characteristic curve to the other voltage-current characteristic curve when one of the line voltage and line current is adjusted by the adjusting unit.

The communication apparatus may further include an oscillation detection circuit that detects whether an oscillation is generated in the communication line network, and the selecting unit may select another voltage-current characteristic curve if the oscillation detection circuit detects that an oscillation is generated at the line voltage and the line current adjusted by the adjusting unit.

The memory unit may store more than two voltage-current characteristic curves, and the selecting unit may sequentially select one of the voltage-current characteristic curve among more than two voltage-current characteristic curves store in the memory unit if the oscillation detection circuit detects the oscillation in the communication line network after the line voltage and the line current are adjusted by the adjusting unit.

The communication apparatus may further include an oscillation detection circuit that detects whether an oscillation is generated in the communication line network, the oscillation detection circuit obtaining an oscillation frequency if the oscillation is detected. The memory unit may store a voltage-current characteristic curve corresponding to the oscillation frequency if an oscillation is detected in the communication line network, and the selecting unit may select the voltage-current characteristic curve corresponding to the oscillation frequency detected by the oscillation detection circuit from the ones stored in the memory unit.

The memory unit may be configured to store multiple voltage-current characteristic curves corresponding to an oscillation frequency of an oscillation generated in the communication line network, and another voltage-current characteristic curve corresponding to the oscillation frequency detected by the oscillation detection circuit may be selected if the oscillation detection circuit detects that an oscillation is generated in the communication line network at the line voltage value and the line current value previously adjusted by the adjusting unit.

If the oscillation detection circuit detects an oscillation in the communication line network at the line voltage value and the line current value adjusted with the adjusting unit, the selecting unit selects a different one of the multiple voltage-current characteristic curves.

The selecting unit may includes a selected voltage-current characteristic curve memory unit that stores the selected voltage-current characteristic curve, and the selecting unit may select a voltage-current characteristic curve which is not store in the tried voltage-current characteristic curve memory.

The communication apparatus may include an operable member that allows a user to manually select one of the multiple voltage-current characteristic curves stored in the memory unit.

The operable member may allow a user to select one of the multiple voltage-current characteristic curves when a connection with the communication line network is established.

According to aspects of the invention, there is also provided a method of adjusting one of a line voltage and a line current applied to a communication line of a communication apparatus. The communication line is connected to a communication line network. The method includes storing multiple voltage-current characteristic curves, adjusting one of the line voltage and the line current based one on of the multiple voltage-current characteristic curves, detecting whether an oscillation is generated in a communication line network, transmitting and receiving data through the communication line network, and re-adjusting one of the line voltage and the line current based on another one of the multiple voltage-current characteristic curves.

According to aspects of the invention, there is further provided a computer program product comprising computer readable instructions that cause a computer to execute a method of adjusting one of a line voltage and a line current applied to a communication line of a communication apparatus. The communication line is connected to a communication line network. In this case, the method executed by the computer may include storing multiple voltage-current characteristic curves, adjusting one of the line voltage and the line current based on one of the multiple voltage-current characteristic curves, detecting whether an oscillation is generated in the communication line network, transmitting and receiving data through the communication line network, and re-adjusting one of the line voltage and the line current based on another one of the multiple voltage-current characteristic curves.

Illustrative Embodiments

Hereinafter, referring to the accompanying drawings, communication apparatuses according to illustrative embodiments of the invention will be described.

Figure 1:
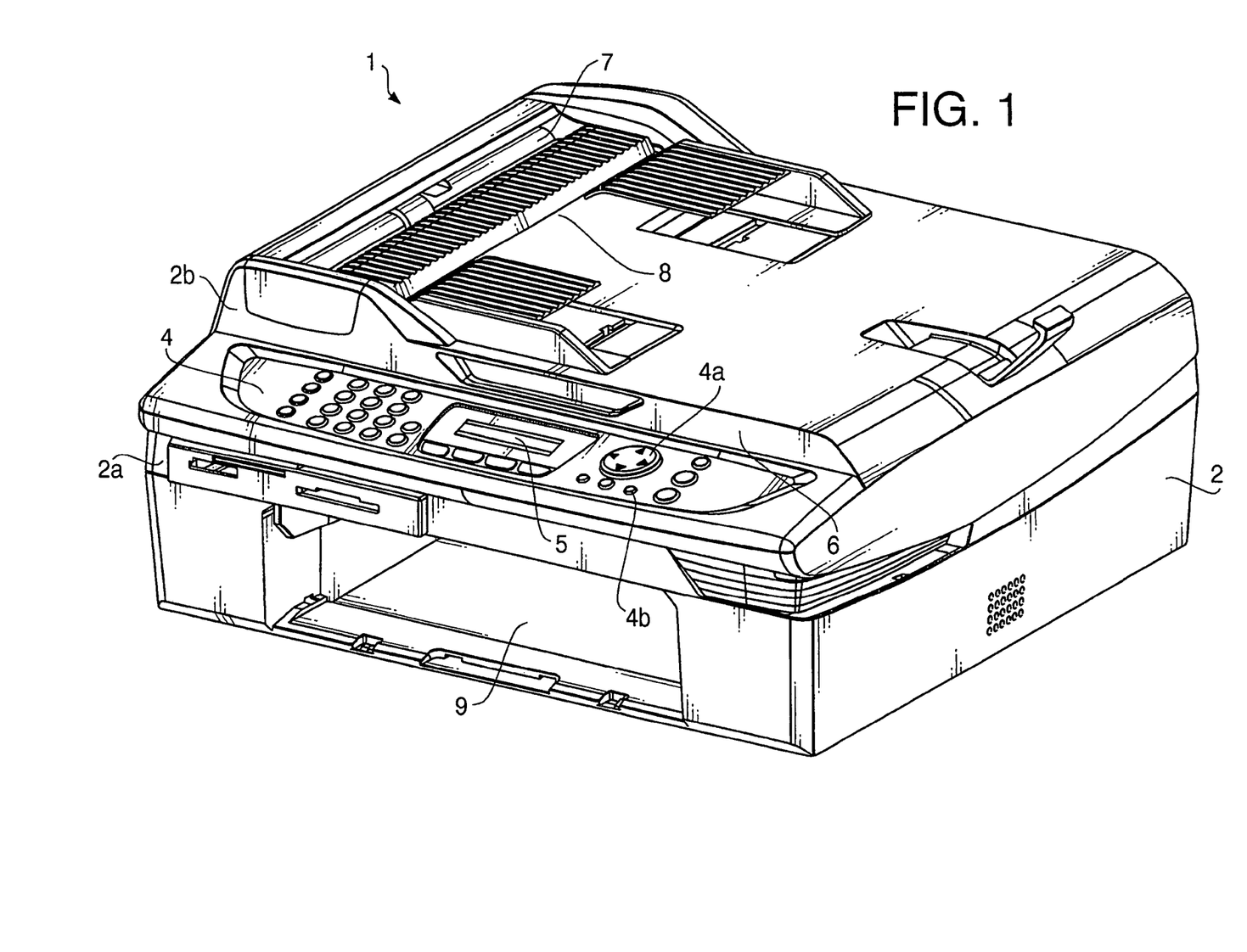
FIG. 1 is a perspective view of a communication apparatus according to a first illustrative embodiment of the invention.
Figure 2:
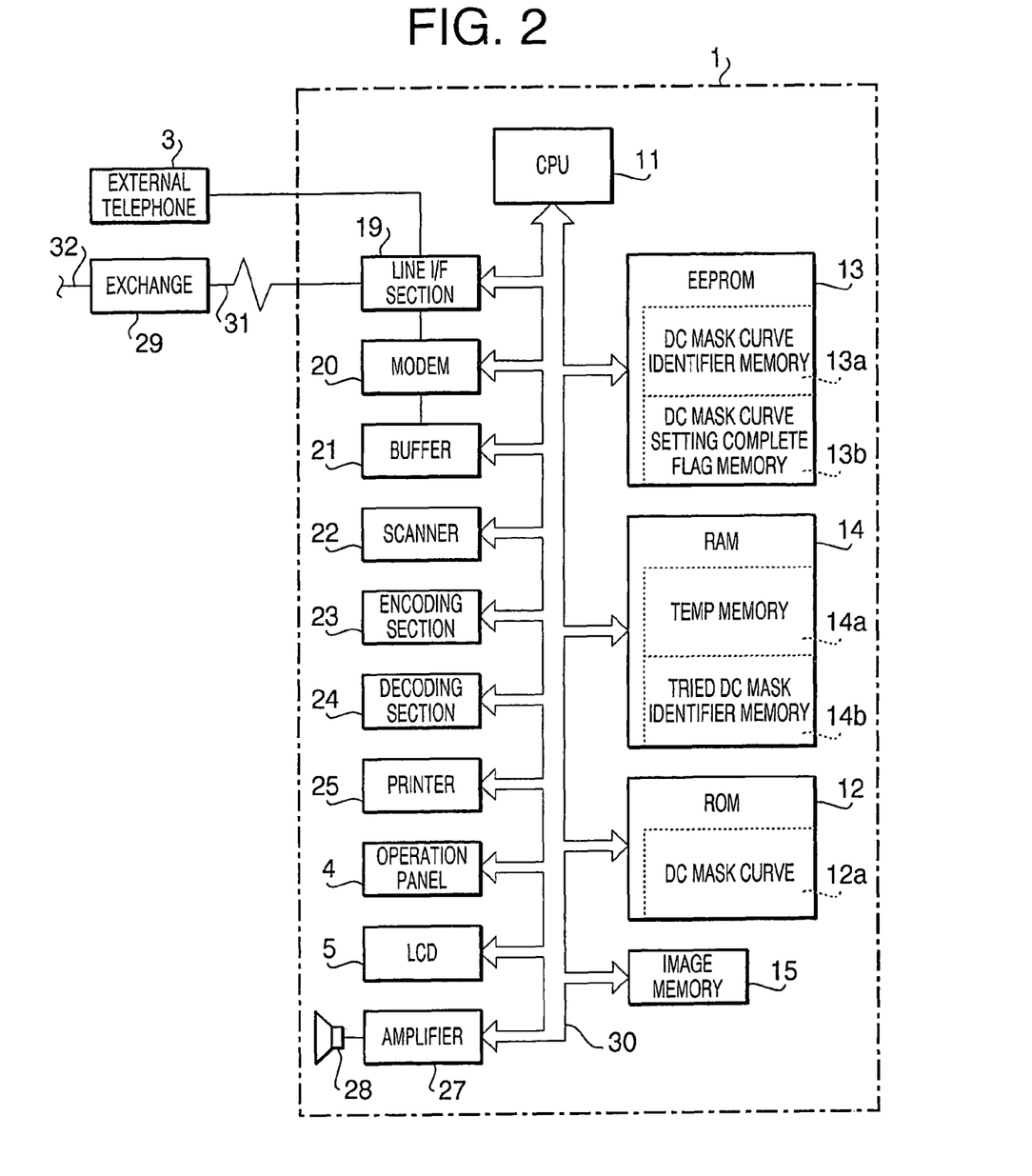
FIG. 2 is a block diagram showing an electronic configuration of the communication apparatus according to the first illustrative embodiment.

FIG. 1 is a perspective view of a communication apparatus 1 according to aspects of a first embodiment of the invention. The communication apparatus 1 is an MFP (Multi Function Peripheral) which has multiple functions such as functions of a facsimile machine, a copier, a scanner, a telephone, etc. The main unit 2 has an upper body portion 2b and a bottom portion 2a. The upper body portion 2b is attached to the bottom portion 2a such that the upper body portion 2b is moved between open/closed positions with respect to the bottom portion 2a. Further, a printer 25 is built in the bottom portion 2a as shown in FIG. 2.

An operation panel 4 is formed on the front side of the upper body portion 2b. The operation panel 4 includes switches to control multiple functions of the facsimile machine, copier, scanner, etc., numeric keys to input numerals, a cursor key 4a to move a cursor displayed on a display unit 5, a confirm key (enter key) 4b which is to be pressed by a user for confirmation of input setting, and the display unit 5 (hereinafter referred to as an "LCD").

An original document outlet 7 and an original document insertion slot 8 are formed in the upper body portion 2b. Original documents inserted through the original document insertion slot 8 are transmitted to the original document outlet 7 while the documents are read by a scanner (CIS: Contact Image Sensor) built in the upper body portion 2b (not shown) and image data is generated.

In addition to the CIS built in the upper body portion 2b, another scanner is built in the bottom portion 2a, which reads original documents placed on a platen glass extending horizontally beneath an original document cover 6.

A recording paper tray (not shown) is placed on a lower side of the bottom portion 2a. The image data generated by the CIS, generated by the scanner 22 or received by the facsimile is printed by the printer 25 on the recording paper transported from the record paper tray.

Referring now to FIG. 2, an electric configuration of the communication apparatus 1 will be described. FIG. 2 is a block diagram showing the electronic configuration of the communication apparatus 1. The communication apparatus 1 includes a CPU 11, ROM 12, EEPROM 13, RAM 14, image memory 15, a line I/F section 19, a modem 20, a buffer 21, a scanner 22, an encoding section 23, a decoding section 24, a printer 25, an operation panel 4, an LCD 5 and an amplifier 27, which are connected to each other through a bus line 30.

The line I/F section 19 is provided for performing line control, and has a semiconductor DAA (Data Access Arrangement) 33 (see FIG. 3), The communication apparatus 1 is connected, through the line I/F section 19, to a telephone line 31. The line I/F section 19 receives various signals such as a call signal and a signal indicating the telephone number of a calling station which are transmitted from an exchange 29. The line I/F section 19 also operate to transmit a dial signal at the calling time responsive to key operations through the operation panel 4 to the exchange 29. An external telephone 3 is connected via external telephone terminals T1 and T2.

The CPU 11 controls the sections connected by the bus line 30 in accordance with various signals transmitted and received through the line I/F section 19. The ROM 12 is a read only memory storing control programs executed by the CPU 11, and it includes DC mask curve memory 12a storing multiple DC mask curves which are used to control a line voltage value and a line current value.

The RAM 14 is a rewritable memory for temporarily storing various pieces of data while the CPU 11 executes control programs. The RAM 14 also includes a temporary memory 14a storing identifier (temp) which is referred to for identifying a type of the selected DC mask curve, and tried DC mask identifier memory 14b storing the identifiers of the tried DC mask curves.

The EEPROM 13, which is an electrically erasable non-volatile memory, includes a DC mask curve identifier memory 13a and a DC mask curve setting complete flag memory 13b. The DC mask curve identifier memory 13a stores the identifier of the DC mask curve to be used to adjust the communication line among multiple DC mask curves stored in the ROM 12. The DC mask curve setting complete flag memory 13b stores the flag which indicates whether the identifier of the DC mask curve is set or not.

The image memory 15 is a memory for storing image data. The received image data is once stored in the image memory 15 and after the image data is printed on the recording paper by the printer 25, the image data is deleted from the image memory 15. The image data generated by the scanner 22 is also stored in the image memory 15. When the facsimile transmission function is set, the image data is sent via the line I/F section. When the copier function is set, the image data is printed on the printer 15, and then deleted from the image memory 15 afterward.

The modem 20 modulates and demodulates image information and communication data for transmission and also transmits and receives various procedure signals for transmission control. The buffer 21 temporarily stores data containing encoded image information transmitted to and/or received from an opposite station.

The scanner 22 reads an original document inserted to an original insertion slot 8 or placed on a platen glass and generates image data The encoding section 23 encodes the image data generated by the scanner 22. The decoding section 24 reads the image data stored in the buffer 21 or the image memory 15 and decodes the image data. The decoded data is printed on recording paper by the printer 25.

The printer 25 according to the illustrative embodiment is an ink jet printer and prints images on the recording papers based on the image data. The amplifier 27 amplifies electronic signals of ringing tones and voices, and drives a loudspeaker 28 to output sound (voice).

The communication apparatus I described above is connected to the telephone line 31 through the line I/F section 19. The telephone line 31 is connected to the exchange 29. The exchange 29 is connected to another exchange via a telephone line 32. The other exchange is further connected to another machine at a calling station or at a destination.

Figure 3:
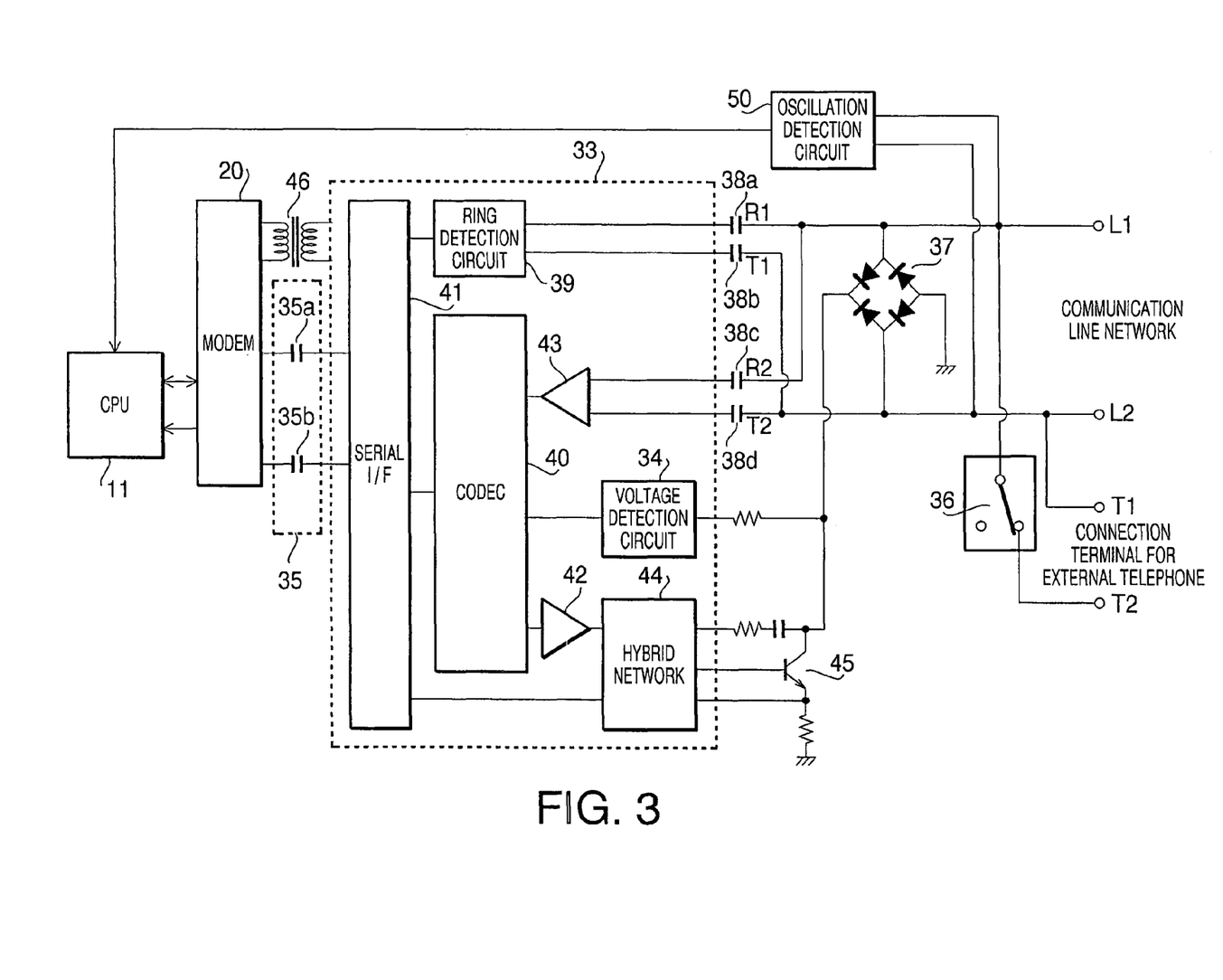
FIG. 3 is a block diagram showing a configuration of a line I/F according to the first illustrative embodiment.

FIG. 3 is a block diagram showing the configuration of the line I/F section 19. The line I/F section 19 includes the semiconductor DAA 33, a CML (Connect MODEM to Line) relay 36 for switching between the telephone and the facsimile, a rectifier bridge 37, and DC loop cut capacitors 38a, 38b, 38c and 38d, a transistor 45, and an oscillation detection circuit 50, etc. In FIG. 3, L1 and L2 are terminals to the telephone line 31, and T1 and T2 are terminals to the external telephone 3.

The semiconductor DAA 33 and the modem 20 are insulated in terms of the direct current. Both of them are connected to an insulation section 35 transmitting data, signals, etc., and a transformer supplying electric power to the semiconductor DAA 33.

The semiconductor DAA 33 is provided with a hybrid network 44, a CODEC 40, a ring detection circuit 39, a transmission amplifier 42, a tone amplifier 43, a serial I/F 41 and a voltage detection circuit 34.

The hybrid network 44 establishes connection with the network and disconnection therefrom. The hybrid network 44 includes a two-wire to four-wire conversion circuit for converting facsimile data via the telephone line 31 into transmission data and received data, a canceller circuit for suppressing wraparound routing of transmission data to a reception path, a filter circuit, and etc. The hybrid network 44 is connected to the positive electrode of the rectifier bridge 37 through a condenser and a resistor. It is also connected to the CODEC 40 via a transmission amplifier 42, and to the base of the transistor 45, and to the serial I/F 41.

The CODEC 40 performs A/D conversion and D/A conversion of facsimile reception data and transmission data. The CODEC 40 is connected to the communication line network and the external telephone 3 through the tone amplifier 43, and is also connected to the hybrid network 44 trough the transmission amplifier 42.

The transmission amplifier 42 performs gain adjustment of transmission data. The tone amplifier 43 is a differential amplifier and receives differential input from the terminals L1 and L2 of the telephone line 31.

When the CODEC 40 receives a tone signal from the telephone line 31 or the external telephone 3, the received tone signal is transmitted through the tone amplifier 43, the CODEC 40, the serial I/F 41, the insulation section 35, and the modem 20 in this order. And the tone detection signal transmitted from the CODEC 40 is transmitted to the CPU 11.

The ring detection circuit 39 is connected to the communication line network and the external telephone 3 through the loop cut capacitors 38a and 38b. The output terminal of the ring detection circuit 39 is connected to the serial I/F 41. When a ring signal reaches the ring detection circuit 39, the ring detection circuit 39 detects the same and outputs the ring detection signal to the serial I/F 41.

The serial I/F converts the ring detection signals input from the ring detection circuit 39 and facsimile reception data input from the CODEC 40 to serial signals, and transmits the serial signals to the modem 20 through the capacitor 35*b*. It also receives a control signal to establish the connection to or disconnect from the communication line network and facsimile transmission data from the modem 20 via the capacitor 35*a*, and separates them respectively. The voltage detection circuit 34 is connected to the rectifier bridge 37 via a resistor and obtains the line voltage value.

The transistor 45 adjusts the line voltage to fit the predetermined voltage current characteristic, based on the value obtained by the voltage detection circuit 34. The line impedance can be adjusted by changing the base voltage of the transistor 45.

The oscillation detection circuit 50 obtains the oscillation frequency when a connection with the network through the telephone line 31 is established and an oscillation occurs in the network. The oscillation detection circuit 50 includes circuits which can detect the oscillation within a predetermined bandwidth. Specifically, the oscillation detection circuit 50 applies the line voltage to band-path filters corresponding to, for example, from 20 kHz to 100 kHz, from 100 kHz to 200 kHz, from 200 kHz to 750 kHz, and 750 kHz to 1 MHz, and if the level of the voltage output from a bandpass filter is higher than the predetermined level, the oscillation detection circuit 50 determines that the oscillation occurs within the frequency range. Further, the oscillation detection circuit 50 is connected to the communication line network through L1 and L2, and the oscillation detection signals are transmitted to the CPU 11.

Figure 11:
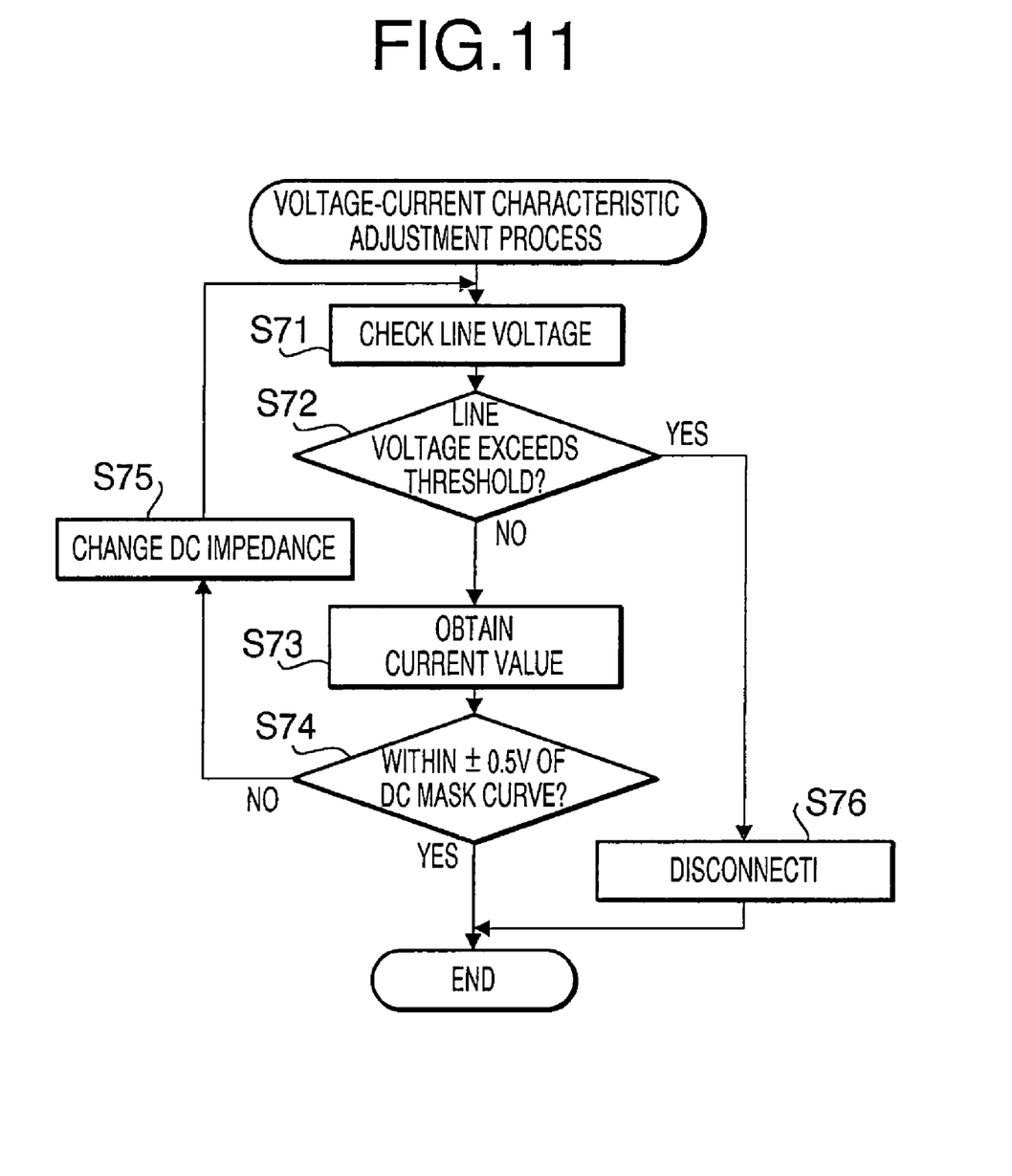
FIG. 11 shows a flowchart illustrating the voltage-current characteristic adjustment process according to the prior art.

Next, processing of the voltage current characteristic adjustment executed when the communication apparatus 1 configured as described above starts receiving or transmitting the information, will be discussed with reference to a flowchart of FIG. 11. FIG. 11 is a flowchart showing how the voltage current characteristic adjustment is executed according to the predetermined DC mask curves stored in the communication apparatus 1. The process is executed after the connection with the network is established.

First, the line voltage value detected by the voltage detection circuit 34 is checked (S71). Whether or not the line voltage value exceeds a threshold voltage (e.g., 100 V) is determined. If the line voltage value does not exceeds (No at S72), the line network is in normal state. Then, the line current value is acquired based on the currently set DC impedance (S73). Next, It is determined whether or not the detected line voltage value is within +/−0.5 V of the decided voltage which is on the currently set DC mask curve and corresponding to the acquired line current value. Here, the currently set DC mask curve means the pre-determined DC mask curve to be applied for voltage-current characteristic adjustment process. When multiple DC mask curves are store in ROM 12, an identifier is stored in a DC mask curve identifier memory 13*a* of EEPROM 13. When trials are done to select an adequate DC mask curve, the identifier is stored in Temp memory 14*a* of RAM 14.

If the line voltage is not within +/−0.5 V of the decided voltage value based on the DC mask curve (No at S74), the base voltage of the transistor 45 is varied to adjust the line impedance (S75), then the process goes back to S71

If the line voltage is within +/−0.5 V of the decided voltage value based on the DC mask curve (Yes at S74), the voltage-current characteristic adjustment process terminates. On the other hand, in the process of S72, if the line voltage value exceeds (Yes at S72), the line network is in abnormal state. Then, the connection with the communication line network is cut off (S76), and the voltage-current characteristic adjustment process terminates.

As described above, when transmitting and receiving begin, the line voltage and the line current are adjusted based on the DC mask curve which is set to meet the required characteristic by the standards.

Next, the DC mask curve selection process will be discussed with reference to a table of DC mask curves shown in FIG. 4, and a flow chart shown in FIG. 5, when the user installs the communication apparatus 1, namely, when the user turns on the power.

Figure 4:
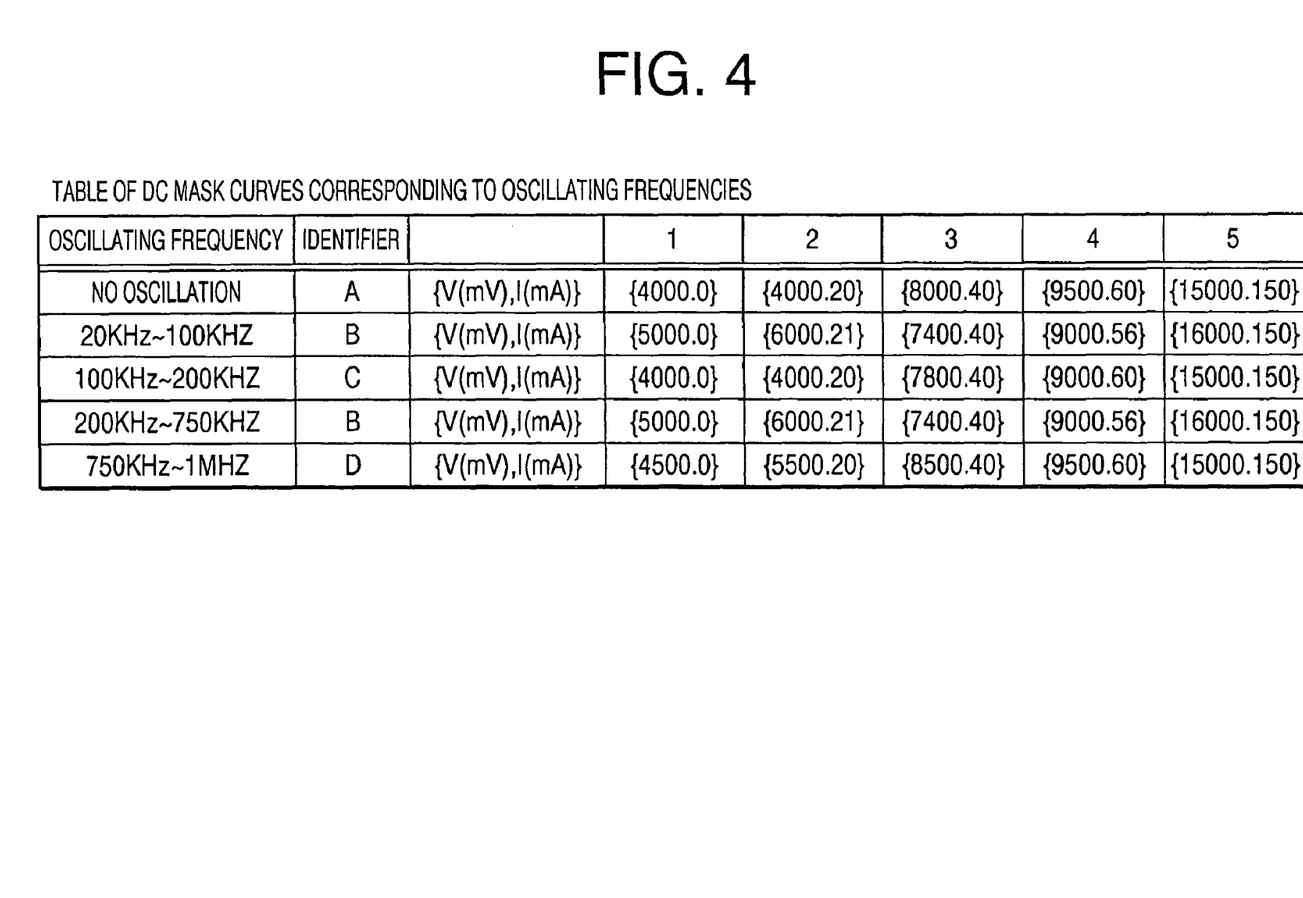
FIG. 4 shows a table indicating DC mask curves stored in a ROM.
Figure 5:
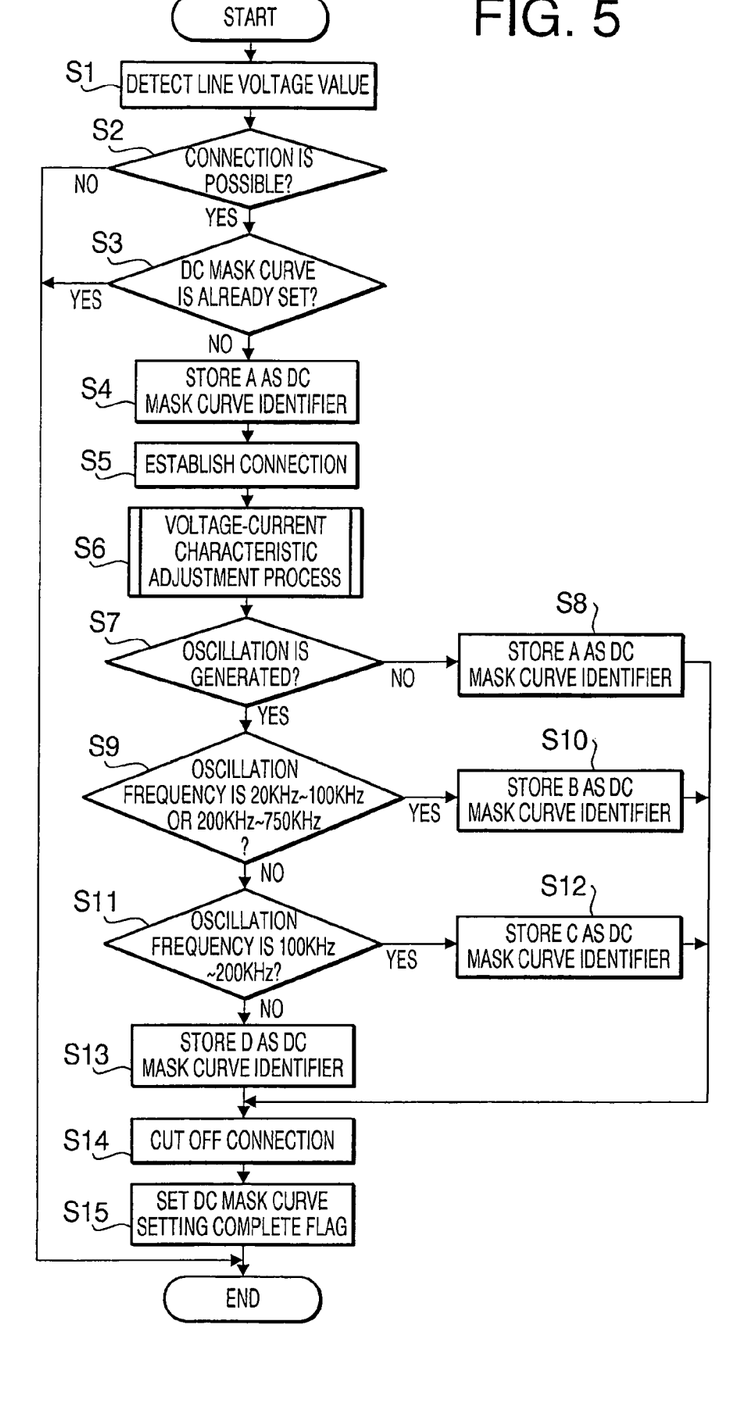
FIG. 5 shows a flowchart illustrating a DC mask curve selection process according to the first illustrative embodiment.

FIG. 4 is a table which shows the DC mask curves stored in the DC mask curve memory 12*a* of the ROM 12. The ROM 12 stores the DC mask curves corresponding to 5 oscillation statuses of the communication network. Each DC mask curve represents 5 points of the voltage-current characteristic. Those points are stored in the memory, the values between two neighboring points being calculated using linear interpolation method.

The DC mask curve shown in the first row of the table corresponds to no oscillation, which has a identifier A. As described above, the voltage-current characteristic is defined by the five points indicated in the table. The first point has the voltage value of 4000 mV(4 V), and the current value of 20 mA. The second point has the voltage value of 4 V and the current value of 40 mA. The third point has the voltage value of 8 V and the current value of 40 mA. The fourth point has the voltage value of 9.5 V and the current value of 60 mA. The fifth point has the voltage value of 15 V and the current value of 150 mA.

For example, a point corresponding the current value 10 mA is not stored in the memory, the point is located between the first point (4 V, 0 mA) and the second point (4 V, 20 mA), therefore, the voltage value is calculated to be 4 V. Similarly, if a current value is 30 mA, the point is located between the second point and the third point. In this case, the voltage value is calculated to be 6 V.

In the second row of the table, the DC mask curve which is applied when an oscillation is generated and its oscillation frequency ranges between 20 kHz and 100 kHz, is shown. The curve is stored in the memory and has an identifier B. The voltage value and the current value of the first point are 5 V and 0 mA. The voltage value and the current value of the second point are 6 V and 21 mA. The voltage values and the current values of the other points are as indicated in the table.

Similarly, in the third row of the table, the DC mask curve which is applied when an oscillation is generated and its oscillation frequency ranges between 100 kHz and 200 kHz. The curve has an identifier C. In the fourth row, the DC mask curve is shown which is applied when an oscillation is generated and its oscillation frequency ranges between 200 kHz and 750 kHz. It has an identifier B. In the fifth row, the DC mask curve is shown which is applied when an oscillation is generated and its oscillation frequency ranges between 750 kHz and 1 MHz, and it has an identifier D. As above, each row of the table shown in FIG. 4 indicates 5 pairs of voltage values and current values defining a DC mask curve.

In this example show in FIG. 4, when the oscillation frequency ranges between 20 kHz and 100 kHz, and when the oscillation frequency ranges between 200 kHz and 750 kHz, the same DC mask curve (identifier: B) is used. Further, the DC mask curve (identifier: A) shown in the first row is a default DC mask curve. If the DC mask curve is applied and the oscillation is not generated, this DC mask curve is set to be applied to the communication apparatus 1.

Next, the DC mask curve setting process is discussed with reference to the flowchart shown in FIG. 5. The DC mask curve setting process is executed when the communication apparatus 1 is powered on.

First, the line voltage value detected by the voltage detection circuit 34 is checked (S1). Then, it is judges whether the line voltage value is equal to or greater than the minimum voltage which allows the communication apparatus 1 to connect with the communication line network (S2). If the line voltage is equal to or greater than the minimum voltage (Yes at S2), the DC mask curve setting complete flag memory 13b is checked, and it is judged whether a DC mask curve has already been set (S3). If the DC mask curve has not been set (No at S3), the identifier A is stored in the Temp memory 14a (S4), and the line is disconnected (S5). Next, the voltage-current characteristic adjustment process (see FIG. 11) is executed (S6). In the voltage-current characteristic adjustment process, the line voltage and line current are adjusted in accordance with the DC mask curve 1 having the identifier of A that is stored in ROM 12.

Subsequently, after the adjustment is done in the voltage-current characteristic adjustment process, it is judged whether the oscillation is generated in the communication line network based on the oscillation detection signal output by the oscillation detection circuit 50 (S7). If the oscillation is not generated (No at S7), an identifier is set to A as the DC mask curve having identifier A is applied. Here, setting an identifier of the DC mask curve as A, an identifier A is stored in the DC mask curve identifier memory 13a of EEPROM 13. Thereafter, when transmission/reception process begins, the voltage-current characteristic adjustment process is executed based on the identifier of the DC mask curve set as above, If it is determined that the oscillation is generated in the communication line network (Yes at S7), it is judged whether the oscillation frequency ranges between 20 kHz and 100 kHz, or between 200 kHz and 750 kHz (S9). If the oscillation frequency ranges between 20 kHz and 100 kHz, or between 200 kHz and 750 kHz (Yes at S9), the identifier of the DC mask curve to be applied is set to B (S10).

If the oscillation frequency does not range between 20 kHz and 100 kHz, or between 200 kHz and 750 kHz (No at S9), it is judged whether the oscillation frequency ranges between 100 kHz and 200 kHz based on the oscillation detection signal output from the oscillation detecting circuit 50 (S11). If the oscillation frequency ranges between 100 kHz and 200 kHz (Yes at S11), the identifier of the DC mask curve to be applied is set to C (S12). If the oscillation frequency does not range between 100 kHz and 200 kHz (No at S11), the identifier of the DC mask curve to be applied is set to D (S13).

When the DC mask curve setting is completed in S8, S10 or S13, the connection with the communication line network is released (i.e., disconnected) (S14), a setting complete flag is set in the DC mask curve setting flag memory (S15), and the DC mask curve setting process terminates. If the line voltage is not equal to or greater than the minimum voltage enabling connection with the communication line network (No at S2), or the DC mask curve has already been set (Yes at S3), the DC mask curve setting process terminates. After termination of this process, the communication apparatus pauses until information is received or a user makes an operation, and a corresponding process is executed according to the received information or the operation the user made. As described above, according to the communication apparatus 1 according to the fist embodiment, the predetermined (default) DC mask curve and some other DC mask curves which correspond to the oscillation frequencies when the oscillation is generated and can be used to cancel the oscillation. When the communication apparatus is installed first time, the predetermined (default) DC mask curve is applied to adjust the voltage-current characteristic. If the oscillation is generated at the determined characteristic, the adequate DC mask curve is set according to the oscillation frequency. Therefore, the communication apparatus 1 itself can suppress the oscillation in the communication line network.

Next, the second embodiment will be described with reference to FIGS. 6 and 7. Here, description similar to that of the first embodiment of the communication apparatus 1 will be omitted for the brevity, and description is made only on the different portions. In the first embodiment, the voltage-current characteristic is adjusted based on the predetermined (default) DC mask curve, then after the adjustment is done, if the oscillation occurs, another adequate DC mask curve is selected according to the oscillation frequency. In the second embodiment, multiple DC mask curves are store corresponding to the oscillation frequency ranges. When the voltage-current characteristic is adjusted based on the selected DC mask curve corresponding to the oscillation frequency, but still an oscillation is generated at the same frequency, then, another DC mask curve can, be selected corresponding to the same oscillation frequency.

Figure 6:
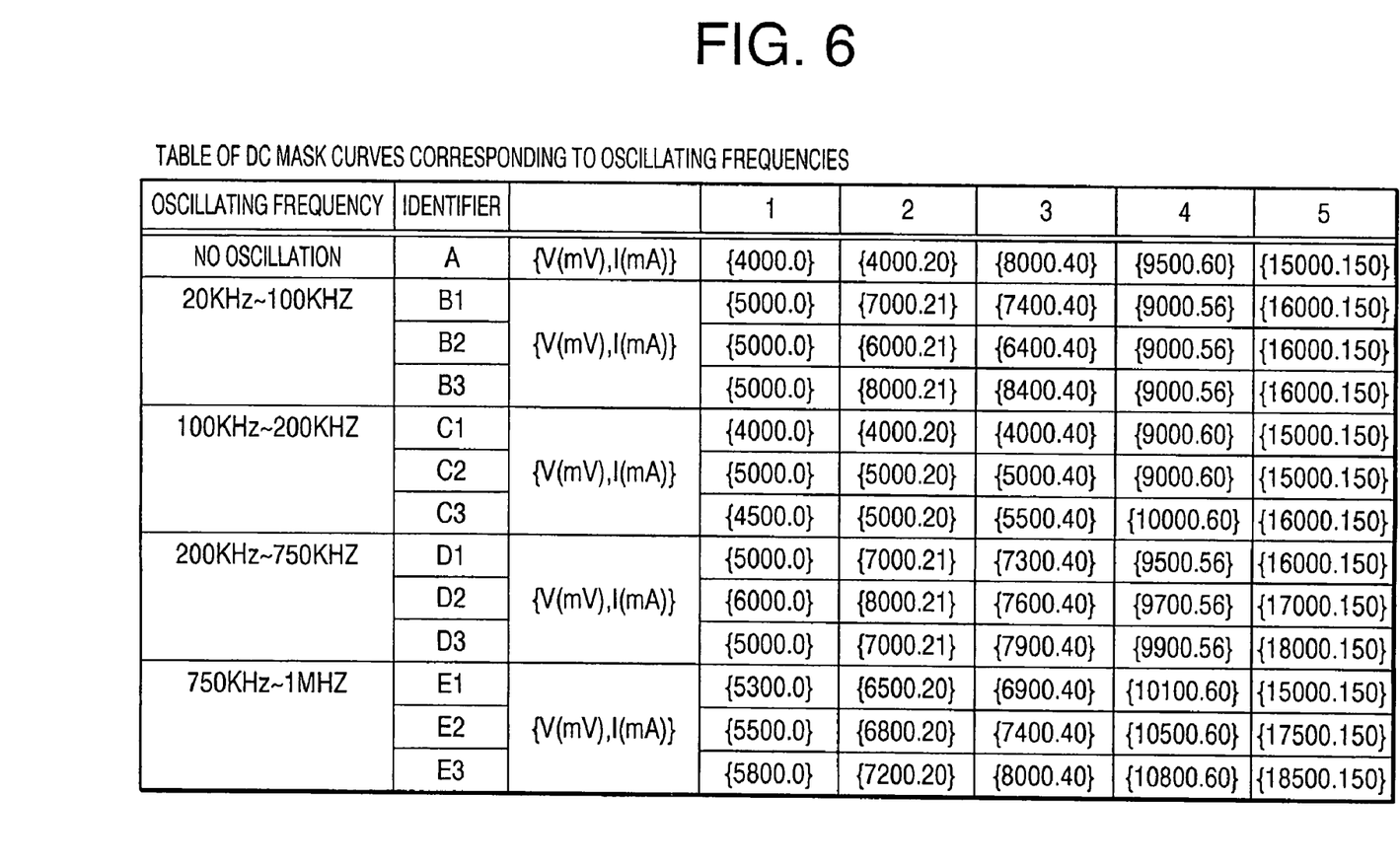
FIG. 6 shows a table of DC mask curves store in ROM according to a second illustrative embodiment.
Figure 7:
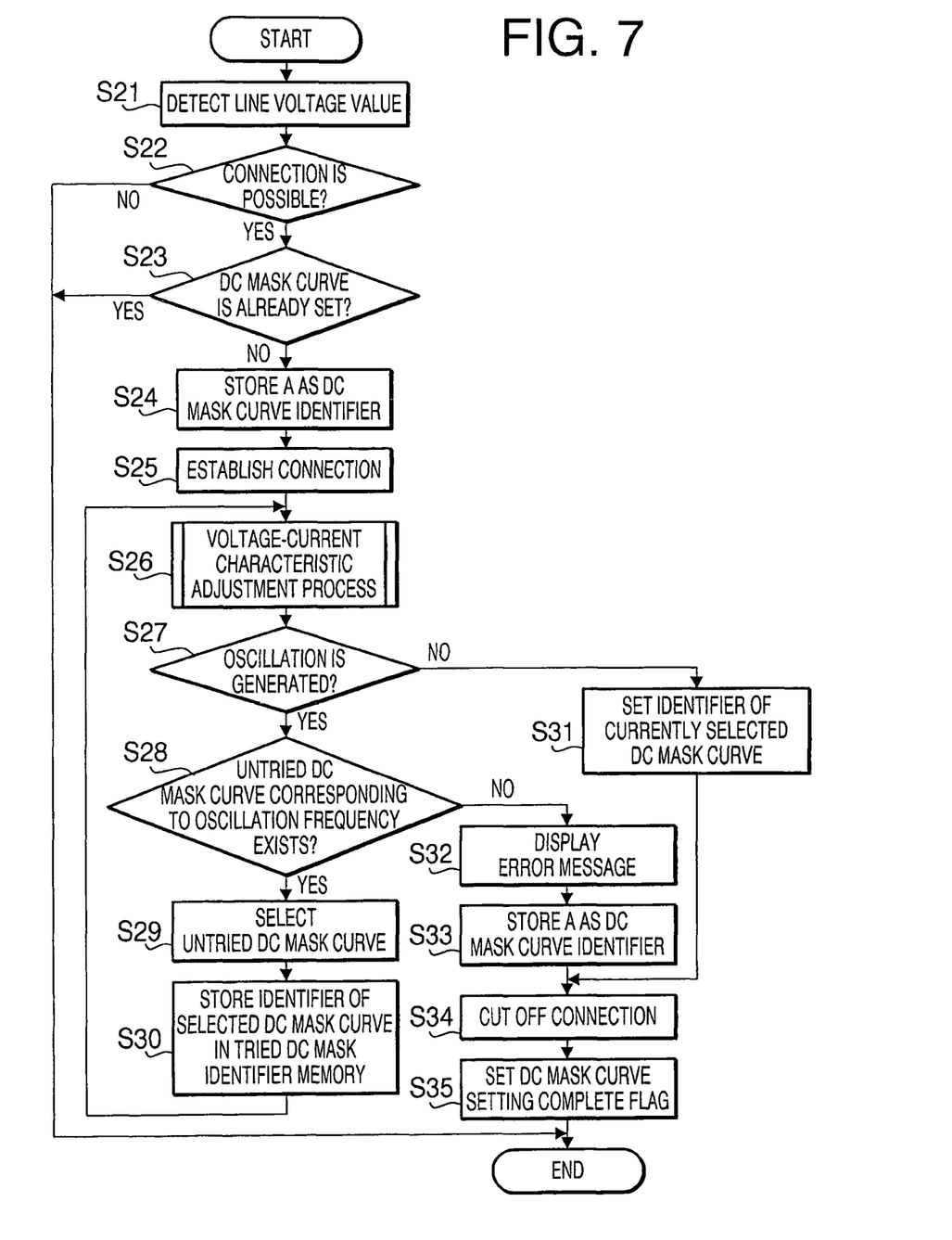
FIG. 7 shows a flowchart illustrating a DC mask curve selection process according to the second illustrative embodiment.

FIG. 6 shows a table of DC mask curves store in the DC mask curve memory 12a of ROM 12 according to the second embodiment. Similar to the first embodiment, the DC mask curve memory 12a stores DC mask curves corresponding to 5 oscillation states. Three DC mask curves are stored corresponding to each of the four kinds of oscillation frequency bandwidths.

Each DC mask curve is defined by 5 points of the voltage-current characteristic, the values between two neighboring points are calculated in accordance with the linear interpolation method as in the first embodiment. The DC mask curve labeled as "NO OSCILLATION" (first row) is the same curve which has identifier A in the first embodiment.

Three DC mask curves identified as B1, B2 and B3 corresponding to the oscillation frequency from 20 kHz to 100 kHz are defined on the second to fourth rows of the table shown in FIG. 6. Three DC mask curves identified as C1, C2 and C3 corresponding to the oscillation frequency from 100 kHz to 200 kHz are defined on the fifth to seventh rows of the table. Three DC mask curves identified as D1, D2 and D3 corresponding to the oscillation frequency from 200 kHz to 750 kHz are defined on the eighth to tenth rows of the table. Three DC mask curves identified as E1, E2 and E3 corresponding to the oscillation frequency from 750 kHz to 1 MHz are defined on the eleventh to thirteenth rows of the table.

Next, the DC mask curve setting process according to the second embodiment will be described with reference to the flowchart shown in FIG. 7. The process is executed when the communication apparatus 1 is powered on.

First, the line voltage value detected by the voltage detection circuit 34 is checked (S21). Then, it is judged whether the line voltage value is equal to or greater than the minimum voltage which allows the communication apparatus 1 to connect with the communication line network (S22). If the line voltage is equal to or greater than the minimum voltage (Yes at S22), the DC mask curve setting complete flag memory 13b of EEPROM 13 is checked, and it is judged whether the DC mask curve has already been set (S23). If a DC mask curve has not been set (No at S23), the identifier A is stored in the Temp memory 14a (S24), and the connection with the network is cut (S25). Next, the voltage-current characteristic adjustment process shown in FIG. 11 is executed (S26), and the line voltage and the line current are adjusted based on the DC mask curve identified by the identifier stored in the Temp memory 14a.

Subsequently, after the adjustment is done in the voltage-current characteristic adjustment process, it is judged whether the oscillation occurs in the communication line network in accordance with the oscillation detection signal output by the oscillation detection circuit 50 (S27). If the oscillation is generated in the communication line network (Yes at S27), the oscillation frequency is acquired from the oscillation detection signal output by the oscillation detection circuit 50, and it is judged whether an untried DC mask curve exists among DC mask curves corresponding to the oscillation frequency stored in ROM 12 referring to the tried DC mask identifier memory 14b of RAM 14 (S28). The ROM 12 stores multiple DC mask curves corresponding to respective oscillation frequency bandwidths, and identifiers of the already tried DC mask curves are stored in RAM 14 in S29, which is described later.

If one or more untried DC mask curve exists (Yes at S28), one of them is selected in the order stored in the table, and the identifier of the selected DC mask curve is stored in the tried DC mask identifier memory 14b (S30) as well as in The Temp memory 14a, and the process returns to S25. So, thereafter, the voltage-current characteristic adjustment process S26 is executed based on the DC mask curve selected in S29.

If it is determined that an oscillation is not generated in the network (No at S27), the DC mask curve identifier stored in the Temp memory 14a is set in the DC mask curve identifier memory 13a. If an untried DC mask corresponding to the oscillation frequency does not exist (No at S28), an error message is displayed on the LCD 5 to indicate an oscillating status (S32), and the identifier of the DC mask curve is set to A. After the DC mask curve is set in S31 and S32, the connection with the network is cut (S34), a flag stored in the DC mask curve setting complete flag memory of EEPROM 13 is set (S35), and the DC mask curve setting process terminates.

As described above, with the communication apparatus 1 according to the second embodiment, the predetermined (default) DC mask curve and multiple DC mask curves corresponding to respective oscillation frequency bandwidths are defined. When the communication apparatus 1 is installed at the first time, the voltage-current characteristic is adjusted based on the predetermined DC mask curve. If an oscillation is generated in that condition, the DC mask curve corresponding to the oscillation frequency. Further, if an oscillation is still generated in that condition, another DC mask curve corresponding to the oscillation frequency is selected. Because the multiple DC mask curves are stored corresponding to respective oscillation frequency bandwidths, even if an oscillation is generated when the voltage-current characteristic is adjusted based on the DC mask curve corresponding to the oscillation frequency, another DC mask curve can be selected. Therefore, the oscillation in the network can be prevented more surely.

Next, a third embodiment will be described with reference to FIG. 8. Here, description similar to the first embodiment is omitted for brevity, and discussion is made only on the different portions. In the first and second embodiments, the voltage-current characteristic is adjusted based on the predetermined (default) DC mask curve. If the oscillation is generated, another DC mask curve corresponding to the oscillation frequency is used for adjustment to cancel the oscillation. According to the third embodiment, the voltage-current characteristic is firstly adjusted based on the predetermined (default) DC mask curve, and if an oscillation is generated in the network after the adjustment is completed, an untried DC curve is selected sequentially from the stored ones in the memory.

In the third embodiment, the DC mask curves stored in ROM 12 are the same as those of the first embodiment (see FIG. 4), and DC mask curves having the identifiers A, B, C and D are stored in this order.

Figure 8:
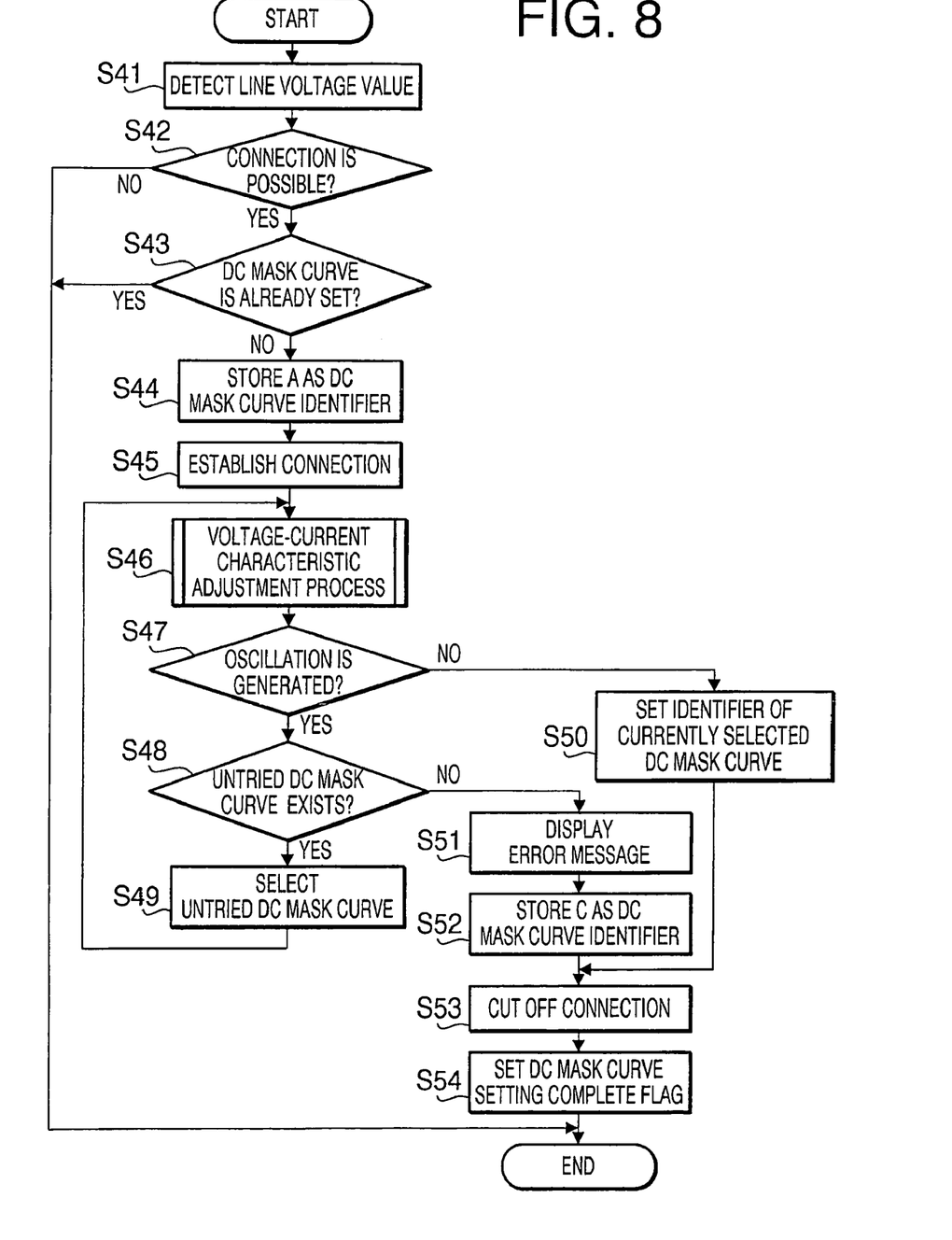
FIG. 8 shows a flowchart illustrating a DC mask curve selection process according to a third illustrative embodiment.

FIG. 8 is a flowchart showing the DC mask curve setting process according to the third embodiment. The process is executed when the communication apparatus 1 is powered on.

First, the line voltage value detected by the voltage detection circuit 34 is checked (S41). Then, it is judged whether the line voltage value is equal to or greater than the minimum voltage which allows the communication apparatus 1 to connect with the communication line network (S42). If the line voltage is equal to or greater than the minimum voltage (Yes at S42), the DC mask curve setting complete flag memory 13b of EEPROM 13 is checked, and it is judged whether the DC mask curve has already been set (S43). If the DC mask curve has not been set (No at S43), the identifier A is stored in the Temp memory 14a (S44), and the connection with the network is cut (S45). Next, the voltage-current characteristic adjustment process (see FIG. 11) is executed (S46). In the voltage-current characteristic adjustment process, the line voltage and the line current are adjusted based on the DC mask curve identified as A that is stored in ROM 12.

Next, after the adjustment is done in the voltage-current characteristic process, it is judged whether the oscillation is generated in the communication line network based on an oscillation detection signal output by the oscillation detection circuit 50 (S47). If the oscillation is generated in the communication line network (Yes at S47), it is judged whether an untried DC mask curve exists among the curves stored in ROM 12 (S48). If an untried DC mask curve exists, the identifier of the DC mask curve is stored in the Temp memory 14a (S49), and the process returns to the voltage-current characteristic adjustment process.

If it is determined that the oscillation is not generated in the network (No at S47), the tried DC mask curve currently store the Temp memory 14a is set to be applied to the communication apparatus 1, while its identifier is stored in the DC mask curve identifier memory of EEPROM 13. If an untried DC mask curve does not exist, an error message is displayed on LCD 5 indicating that an oscillation is generated using any DC mask curve stored in ROM 12 (S51), and the identifier of the DC mask curve is set to A (S52).

After the DC mask curve is set in S50 and S52, the connection with the network is cut (S53), a flag stored in the DC mask curve setting complete flag memory 13b of EEPROM 13 is set (S54), and the DC mask curve setting process terminates. If in the process S42, the line voltage is less than the minimum voltage allowing to connect with the network (No at S42), or in the process S43, a DC mask curve is already set (Yes at S43), the DC mask curve setting process terminates.

In addition, according to the third embodiment, it is not necessary to detect the oscillation frequency when an oscillation is generated in the network, so the oscillation detection circuit 50 can output an oscillation detection signal when an output level of a high-pass filter is above the predetermined value where the line voltage is input to the high-pass filter of which cut off frequency is, for an example, 20 kHz.

As described above, with the communication apparatus 1 according to the third embodiment, the ROM 12 stores multiple DC mask curves. If an oscillation is generated in the network when the voltage-current characteristic is adjusted based on one of them, untried DC mask curves are selected sequentially until the oscillation is suppressed, the DC mask curve is set to be applied to the communication apparatus 1 so as to prevent an oscillation in the network.

Next, a fourth embodiment is discussed with reference to FIG. 9. Here, repetitive description will be omitted, and description will be made only on different portions. In the first, second and third embodiments, the voltage-current characteristic is adjusted based on the predetermined (default) DC mask curve. Then, after the adjustment, the oscillation detection circuit 50 detects whether an oscillation is generated, and according to the output of the oscillation detection circuit 50, one of DC mask curves stored in ROM 12 is selected. According to the fourth embodiment, the communication apparatus 1 has a selection controller with which a user can select any of the multiple DC mask curve. Then the user can select and set the most adequate DC mask curve. In the fourth embodiment, two DC mask curves identified as A and B of multiple curves shown in FIG. 4 are employed.

The operational proceeds as follows. First, the DC mask curve selection mode is set with the cursor key 4a of the operation panel 4, etc. The LCD 5 displays a message indicating the DC mask curve currently set. For an example, when the DC mask curve identifier A is set, the message is "Level 1", and when the DC mask curve identifier B is set, the message is "Level 2".

Next, when DC mask curve change is directed with the cursor key 4a, the message displayed on LCD 5 is changed. When the confirmation key 4b is pressed, the changed DC mask curve is set.

Figure 9:
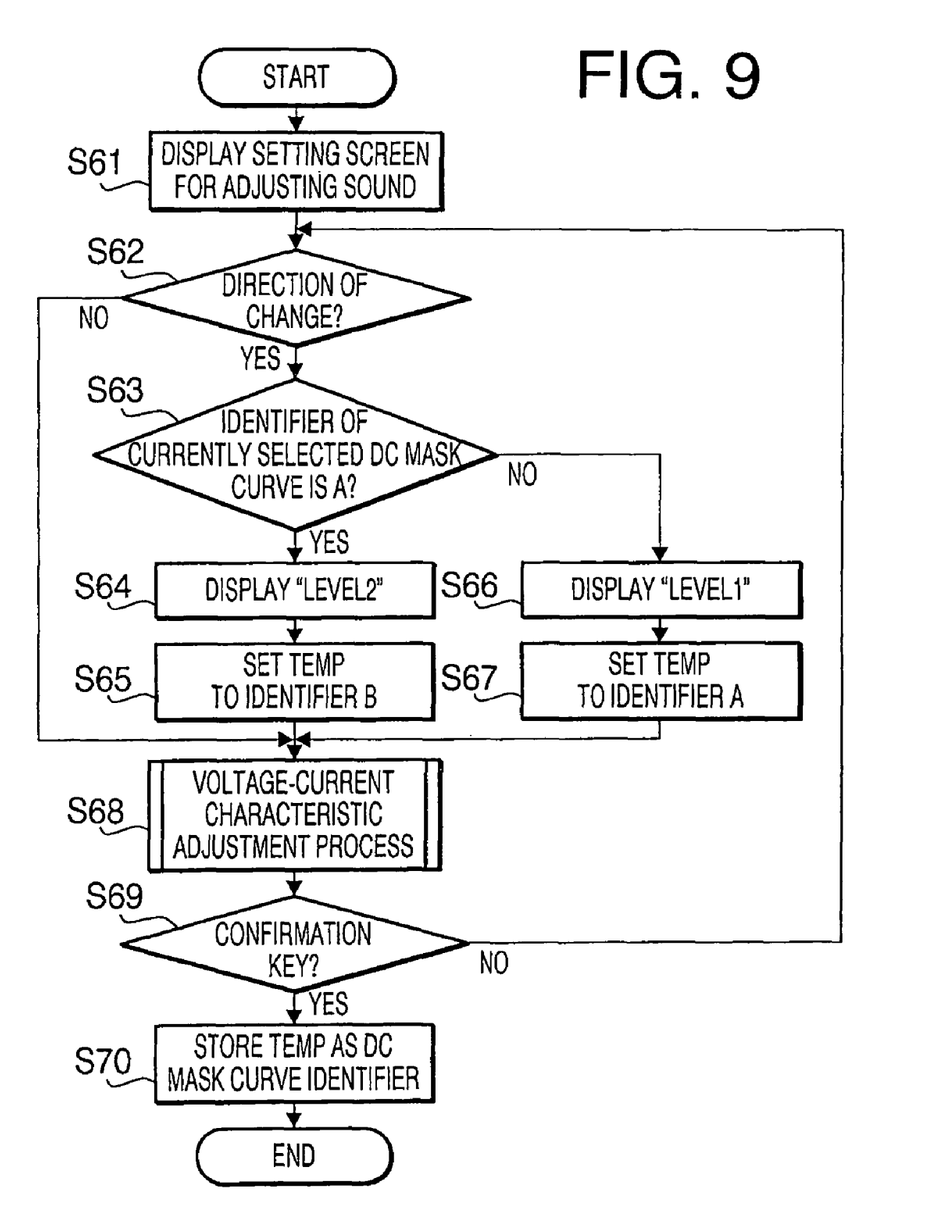
FIG. 9 shows a flowchart illustrating a DC mask curve selection process according to a fourth illustrative embodiment.

FIG. 9 shows a flowchart of the process that is invoked when the DC mask curve selection mode is set with the cursor key 4a operation. The LCD 5 displays a message indicating a setting screen for adjusting sound quality together with a message indicating the identifier of the DC mask curve currently stored in the DC mask curve identifier memory 13a of EEPROM 13 (S61). Namely, when identifier A is stored in the DC mask curve identifier memory 13a of EEPROM 13, the message is "Level 1", and when identifier B is stored, the message is "Level 2".

Next, it is judged whether the controller to direct a change of the currently set DC mask curve is operated (S62). When the cursor key 4a to change DC mask curves is operated (Yes at S62), it is judged whether the identifier of the currently set DC mask curve is A by referring to the DC mask curve identifier memory 13a (S63).

If the stored identifier is A (Yes at S63), LCD 5 displays the message "Level 2" (S64) and the identifier B is stored in the Temp memory 14a of RAM 14. If the stored identifier is not A (No at S63), the LCD 5 displays the message "Level 1" (S66) and the identifier A is stored in the Temp memory 14a of RAM 14.

In S64 or S65, when the identifier is stored in the Temp memory 14a, the voltage-current characteristic adjustment is executed based on the DC mask curve identified by the identifier stored in the Temp memory 14a (S68). The voltage-current characteristic adjustment is the process shown in the flowchart in FIG. 11. Next, it is judged whether the confirmation key 4b is operated (S69). If the confirmation key 4b is operated (Yes at S69), the identifier stored in the Temp memory 14a is stored in the DC mask curve identifier memory 13a of EEPROM 13 (S70).

As described above, according to the communication apparatus 1 of the fourth embodiment, two DC mask curves are stored in ROM 12, and a user can select any of the two DC mask curves to be applied to adjustment of the voltage-current characteristic. Therefore, the voltage-current characteristic is adjusted based on the selected DC mask curve. If an oscillation is generated in that condition, the other DC mask curve can be selected.

In particular, when a telephone set is built in the communication apparatus 1 and the connection with the network is established, the user can select and set the DC mask curve so as to suppress noise caused by the oscillation generated in the network checking with a handset receiver.

In the first embodiment of the communication apparatus 1, the communication apparatus is a multiple function processing machine which has multiple functions such as, facsimile, copier, scanner, telephone. However, the invention is not limited to this embodiment. The communication apparatus 1 may a single function communication apparatus. In the first embodiment of the communication apparatus 1, the communication apparatus 1 has a voltage detection section which detects the line voltage, and the line current is calculated based on the line impedance. The communication apparatus 1 may have a current detection section instead of a voltage detection section, and the line voltage is calculated based on the line impedance. The communication apparatus 1 may also have both a voltage detection section and a current detection section. Further, in the first embodiment of the communication apparatus 1, when an oscillation is generated in the network, the oscillation frequency is acquired and the voltage-current characteristic is selected corresponding to the oscillation frequency. When an oscillation is generated in the network, a oscillation level may be detected, and the voltage-current characteristic curve is selected corresponding to the oscillation level.

What is claimed is:

1. A communication apparatus, comprising:
a line control unit configured to control connection with a communication line network;
a communication unit configured to transmit and receive data through the communication line network;
a detection circuit configured to detect one of a line voltage value and a line current value when the communication apparatus is connected to the line network;
a memory unit configured to store multiple voltage-current characteristic curves defining relationships of line voltage values with respect to line current values;
an oscillation detection circuit that detects whether an oscillation is generated in the communication line network;
an adjusting unit configured to obtain a line voltage value and a line current value, which correspond to the one of the line voltage value and the line current value detected by the detection circuit, based on a predetermined one of the multiple voltage-current characteristic curves stored in the memory unit, and adjusting one of a line voltage and a line current based on the predetermined one of the multiple voltage-current characteristic curves, so that the obtained line voltage value and line current value fall within a predetermined range defined by the predetermined one of the multiple voltage-current characteristic curves;
a selecting unit configured to select another one of the multiple voltage-current characteristic curves, which is different from the predetermined one of the multiple voltage-current characteristic curves from among the multiple voltage-current characteristic curves stored in the memory unit; and
a re-adjusting unit configured to control the adjusting unit based on the selected another one of the multiple voltage-current characteristic curves selected by the selecting unit after one of the line voltage and line current are adjusted by the adjusting unit,
wherein the selecting unit selects the another one of the multiple voltage-current characteristic curves when the oscillation detection circuit detects that the oscillation is generated, after the adjusting unit adjusts the line voltage and the line current based on the predetermined one of the multiple voltage-current characteristic curves stored in the memory unit.

2. The communication apparatus according to claim 1, wherein the memory unit stores two voltage-current characteristic curves, and wherein the selecting unit is configured to switch the selected voltage-current characteristic curve from the predetermined voltage-current characteristic curve to the another voltage-current characteristic curve when one of the line voltage and line current are adjusted by the adjusting unit.

3. The communication apparatus according to claim 1, wherein the memory unit stores more than two voltage-current characteristic curves, and
wherein the selecting unit sequentially selects one of the multiple voltage-current characteristic curves, other than the predetermined voltage-current characteristic curve, among more than two voltage-current characteristic curves stored in the memory unit when the oscillation detection circuit detects the oscillation in the communication line network after the line voltage and the line current are adjusted by the adjusting unit.

4. The communication apparatus according to claim 1, wherein the oscillation detection circuit obtains an oscillation frequency when the oscillation is detected,
wherein the memory unit stores a voltage-current characteristic curve corresponding to the oscillation frequency if an oscillation is detected in the communication line network, and
wherein the selecting unit is configured to select the voltage-current characteristic curve corresponding to the oscillation frequency detected by the oscillation detection circuit from the ones stored in the memory unit.

5. The communication apparatus according to claim 4, wherein the memory unit is configured to store multiple voltage-current characteristic curves corresponding to an oscillation frequency of an oscillation generated in the communication line network, and
wherein a second voltage-current characteristic curve corresponding to the oscillation frequency detected by the oscillation detection circuit is selected if the oscillation detection circuit detects that an oscillation is generated in the communication line network at the line voltage value and the line current value previously adjusted by the adjusting unit based on a first voltage-current characteristic curve corresponding to the oscillation frequency.

6. The communication apparatus according to claim 1, wherein, if the oscillation detection circuit detects an oscillation in the communication line network at the line voltage value and the line current value adjusted with the adjusting unit, the selecting unit selects a different one of the multiple voltage-current characteristic curves stored in the memory unit.

7. The communication apparatus according to claim 6, wherein the selecting unit includes a selected voltage-current characteristic curve memory unit that stores the selected voltage-current characteristic curve, and
wherein the selecting unit selects a voltage-current characteristic curve which is not stored in the selected voltage-current characteristic curve memory.

8. The communication apparatus according to claim 1, wherein the communication apparatus includes an operable member that allows a user to manually select one of the multiple voltage-current characteristic curves stored in the memory unit.

9. The communication apparatus according to claim 8, wherein the operable member allows a user to select one of the multiple voltage-current characteristic curves when a connection with the communication line network is established.

10. A method of adjusting one of a line voltage and a line current applied to a communication line of a communication apparatus, the communication line being connected to a communication line network, the method comprising:
storing multiple voltage-current characteristic curves;
detecting one of a line voltage value and a line current value when the communication apparatus is connected to the communication line network;
adjusting one of the line voltage and the line current based on a predetermined one of the stored multiple voltage-current characteristic curves stored in the memory unit, wherein the detected line voltage value and line current value fall within a predetermined range defined by the predetermined one of the multiple voltage-current characteristic curves;
detecting whether an oscillation is generated in a communication line network;
transmitting and receiving data through the communication line network; and
re-adjusting one of the line voltage and the line current based on another one of the stored multiple voltage-current characteristic curves, other than the predetermined one of the stored multiple voltage-current characteristic curves, upon detecting the generation of the oscillation in the communication line network.

11. A computer program product comprising computer readable instructions stored on a computer readable medium that cause a computer to execute a method of adjusting one of a line voltage and a line current applied to a communication line of a communication apparatus, the communication line being connected to a communication line network, the method comprising:
storing multiple voltage-current characteristic curves;
detecting one of a line voltage value and a line current value when the communication apparatus is connected to the communication line network;
adjusting one of the line voltage and the line current based on a predetermined one of the stored multiple voltage-current characteristic curves stored in the memory unit, wherein the detected line voltage value and line current value fall within a predetermined range defined by the predetermined one of the multiple voltage-current characteristic curves;
detecting whether an oscillation is generated in a communication line network;
transmitting and receiving data through the communication line network; and
re-adjusting one of the line voltage and the line current based on another one of the stored multiple voltage-current characteristic curves, other than the predetermined one of the stored multiple voltage-current characteristic curves, upon detecting the generation of the oscillation in the communication line network.

* * * * *